(12) United States Patent
Koshy et al.

(10) Patent No.: US 12,206,944 B2
(45) Date of Patent: Jan. 21, 2025

(54) CONTENT PERSONALIZATION BASED ON REINFORCEMENT LEARNING

(71) Applicant: Adeia Guides Inc., San Jose, CA (US)

(72) Inventors: Kamal J. Koshy, Aurora, CO (US);
Dhananjay Lal, Englewood, CO (US);
Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/102,573

(22) Filed: Jan. 27, 2023

(65) Prior Publication Data

US 2024/0259634 A1 Aug. 1, 2024

(51) Int. Cl.
  H04N 21/466 (2011.01)
  G06F 16/9535 (2019.01)
  H04N 21/475 (2011.01)

(52) U.S. Cl.
  CPC ..... *H04N 21/4668* (2013.01); *G06F 16/9535* (2019.01); *H04N 21/4758* (2013.01)

(58) Field of Classification Search
  CPC ............ H04N 21/4668; H04N 21/4758; G06F 16/9535
  See application file for complete search history.

(56) References Cited

U.S. PATENT DOCUMENTS

| | | | | |
|---|---|---|---|---|
| 8,220,022 | B1 * | 7/2012 | Pan | H04N 21/252 725/47 |
| 2012/0290522 | A1 * | 11/2012 | Dolan | G06Q 30/00 706/46 |
| 2017/0212874 | A1 * | 7/2017 | Urban | G06F 3/0485 |
| 2020/0409983 | A1 * | 12/2020 | Miller | H04N 21/44204 |
| 2021/0321165 | A1 * | 10/2021 | Yasir | H04N 21/4661 |

OTHER PUBLICATIONS

Anonymous , "Behind The Scenes of The Netflix Recommendation Algorithm", Anonymous, "Behind The Scenes of The Netflix Recommendation Algorithm" Invisibly (Nov. 10, 2021) [Retrieved from: https://www.invisibly.com/learn-blog/netflix-recommendation-algorithm/].

Anonymous , "How Netflix's Recommendations System Works", Anonymous, "How Netflix's Recommendations System Works", [retrieved from URL: https://help.netflix.com/en/node/100639] (3 pages).

(Continued)

*Primary Examiner* — John W Miller
*Assistant Examiner* — Akshay Doshi
(74) *Attorney, Agent, or Firm* — Haley Guiliano LLP

(57) ABSTRACT

Methods and systems are provided herein for providing media asset recommendations to a user based on user input in real time and using a reinforcement learning model or media asset recommendation model. The model includes a plurality of states, each having a set of media asset recommendations, a plurality of available user input options, and a state value. During a browsing session, a first set of media asset recommendations is provided to a user based on a current state corresponding to the browsing session. The user then selects a user input option, and a second set of media asset recommendations is determined based on the received user input option. The second set of media asset recommendations is then provided to the user during the browsing session.

19 Claims, 7 Drawing Sheets

(56) References Cited

OTHER PUBLICATIONS

Anonymous, "Netflix Prize", Anonymous, "Netflix Prize" "https://en.wikipedia.org/wiki/Netflix_Prize".

Basilico, Justin, "Netflix Explains Recommendations and Personalization", Basilico, "Netflix Explains Recommendations and Personalization", Scale Virtual Events, (Oct. 21, 2021), [https://exchange.scale.com/public/blogs/netflix-insights-on-recommendations-and-personalization] (24 Pages).

Gomez-Uribe, Carolos A., et al., "The Netflix Recommender System: Algorithms, Business Value, and Innovation", Gomez-Uribe, et al. "The Netflix recommender system: Algorithms, business value, and innovation" ACM Trans. Manage. Inf. Syst. 6, 4, Article 13 (Dec. 2015), 19 pages. DOI: http://dx.doi.org/10.1145/2843948.

Hardesty, Larry, "The history of Amazon's recommendation algorithm", Hardesty, "The history of Amazon's recommendation algorithm", Amazon Science, (Nov. 22, 2019) [Retrieved from https://www.amazon.science/the-history-of-amazons-recommendation-algorithm] (8 pages).

Kasula, Chaithanya Pramodh, "Netflix Recommender System—A Big Data Case Study", Kasula, "Netflix Recommender System—A Big Data Case Study", Medium, (Jun. 28, 2020) [https://towardsdatascience.com/netflix-recommender-system-a-big-data-case-study-19cfa6d56ff5] (25 pages).

Scognamiglio, Michael, "Netflix Recommendation System: Inside the Algorithm", Scognamiglio, "Netflix Recommendation System: Inside the Algorithm" Medium, (Oct. 26, 2020) [Retrieved from https://mikescogs20.medium.com/netflix-recommendation-system-inside-the-algorithm-55edc1712748] (10 pages).

Sutton, Richard S., "Reinforcement Learning: An Introduction", Sutton, R., et al., "Reinforcement Learning: An Introduction," The MIT Press, 10 pages (2018).

\* cited by examiner

CONTENT PERSONALIZATION BASED ON REINFORCEMENT LEARNING

FIELD OF THE INVENTION

This disclosure relates to systems and methods for providing media content recommendations for various media content distribution systems, and more particularly providing media content recommendations based on user input to a reinforcement learning model.

BACKGROUND

Access to an increasing variety of content continues to grow through proliferation of mobile devices, streaming platforms, and more. As the options for media increase, it becomes increasingly important to appropriately organize, store, recommend, and provide access to content in a way that matches users' needs. Various platforms and systems provide ways to recommend content to users based on context, user history, and popularity. Generally, some user content preferences may be learned based on selection of content items via an interactive guidance application. For instance, if a comedy show is selected, more comedy shows may be recommended next time. Such approaches, however, fail to account for browsing and navigation actions of users in real time. Moreover, these approaches do not generate, modify, or update their recommendations in real time based on, e.g., up-to-the-moment browsing and navigation actions such as scrolling past, pausing on, selecting, requesting more information, and/or exiting. There exists a need to recommend and provide content items to a user based on the user's real-time browsing and navigation actions and the decisions about such content items indicated by such actions.

SUMMARY

Methods and systems are disclosed herein for providing media asset recommendations to a user based on user input and using a reinforcement learning model or media asset recommendation model. Content personalization in the form of personalized movie, TV show, or other media asset recommendations is an important aspect of many entertainment systems. Content personalization is used to improve user experience and drive increased engagement. Content personalization can take the form of personalizing the recommendations made to users (e.g., selecting which movies, TV shows, etc. to display), as well as personalizing the ranking, ordering, placement on a display, and various other aspects of presentation of the movies, TV shows, and more.

Certain content personalization systems may collect only certain user actions, such as which titles are played by a user. The media asset recommendations provided by these systems are made with limited or incomplete information about the user, and are therefore less accurate than desired.

Certain content personalization systems operate in an "offline" manner, whereby media asset recommendations are updated only after a user's browsing session has ended. These systems may update their recommendations by receiving user data, sometimes in the form of a batch of user actions, after the user's browsing session ends. Upon the user starting a new browsing session, these systems may then provide new media asset recommendations that incorporate the user actions from the previous browsing session(s). These systems do not update their model and/or media asset recommendations during a browsing session using user input from that browsing session, but only after the current browsing session ends.

As a result, some recommendation systems are limited in that they collect only certain information, and/or update their models and/or recommendations based on user actions only after the browsing session that included those user actions has ended.

To address these problems and others, certain embodiments of the present disclosure include collecting real-time browsing information and user input, and using this information to update the model and recommendations in real time during the current browsing session. Embodiments of the present disclosure provide more up-to-date and relevant recommendations, resulting in an improved user experience that drives greater user engagement.

Embodiments of the present disclosure provide mechanisms to incorporate the real-time browsing histories of users during a browsing session in which the user is interacting with the media recommendation application. Embodiments include the use of a reinforcement learning model or media asset recommendation model that operates using rewards that are dictated by real-time user inputs and user behavior.

As a simplified example, a user can be presented with a set of media asset recommendations (e.g., movies, TV shows, etc.) when they start their browsing session. While the user is browsing the recommended titles, each action the user takes (e.g., scrolling, changing genres, playing a movie, exiting the system, etc.) is identified. If, for example, the user continues to scroll through the "action movies" genre without selecting any title to watch, the probability of the user selecting an action movie reduces and is used in the model. In addition, the model is rewarded when the user selects a movie or title that is presented to the user. The probability of receiving a reward reduces as the user continues to scroll without selecting a movie or title. The media recommendation application uses this real-time browsing information, along with previous history of the user (and/or other similar users), to suggest a comedy movie instead. In some cases, the media recommendation application can dynamically present alternate media asset recommendations to the user if the user is browsing titles or a particular genre that is a low match for the user preferences. This can include modifying one or more user interface (UI) elements to display appropriate media asset recommendations to the user.

In some examples, a media recommendation application accesses a media asset recommendation model. The media asset recommendation model may be a Markov model, including a plurality of states and state transitions. Each state may have a corresponding set of media asset recommendations and a plurality of possible user input options. The media recommendation application determines the current state for the user (e.g., which genre to begin with, or which genre is currently selected). The media recommendation application then provides a first set of media asset recommendations to the user. These recommendations may be determined using any suitable model, such as existing models that rank titles based on relevance, popularity, or some other metric. The first set of recommendations is then presented to the user, who then has the option to interact by selecting a user input option (e.g., scrolling, changing genres, playing the selected title, exiting, etc.). The media recommendation model then detects the user input and updates the media asset recommendation model to reflect the user input. The updated media asset recommendation model is then used to determine a second set of media asset recommendations (which may be different from the first set of media asset recommendations). The second set of media asset recommendations is then provided to the user for display and interaction by the user. In practice, this may include dynamically updating the display shown to the user, such that the second set of media asset recommendations replaces the first set of media asset recommendations in response to the user input.

In some examples, the media recommendation application provides the second (or updated) set of recommendations before a next user input is received. That is, after the first user input is received, the second set of recommendations is provided to the user in real time during the same browsing session.

In some examples, the second (or updated) set of recommendations includes one or more of the same titles from the first set of recommendations. Additionally, the first and second sets of recommendations may include subsets that are immediately available for display to a user or are stored in a cache for later display. Determining the second (or updated) set of recommendations can include changing or rearranging the subset of titles for immediate display, the subset of titles cached for later display, or a combination of both.

In some examples, the media recommendation application automatically switches the state or genre being browsed by the user. The switch can occur based on the long-term predicted system rewards associated with each genre. The media recommendation application may indicate the genre change by changing one or more of a text, image, color, highlighting, shading, or other visual cues to indicate to the user that the genre and/or recommended titles have changed during the browsing session.

In some examples, the media recommendation application predicts the user input option, and responsively makes one or more changes based on that prediction. For instance, if the application predicts that the user is about to exit the system, the application may make a recommendation that is the most likely to keep the user engaged.

In some examples, the media recommendation application may determine whether to explore the model corresponding to the user in order to build up a confidence level associated with the rewards and probabilities for each state, or to exploit the information the model has already gathered. The media recommendation application may make this determination in order to balance building up confidence in predicting user behavior when presented with choices similar to previous browsing sessions with exploring user behavior when presented with new and different choices.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts, and in which.

DETAILED DESCRIPTION

Figure 1:
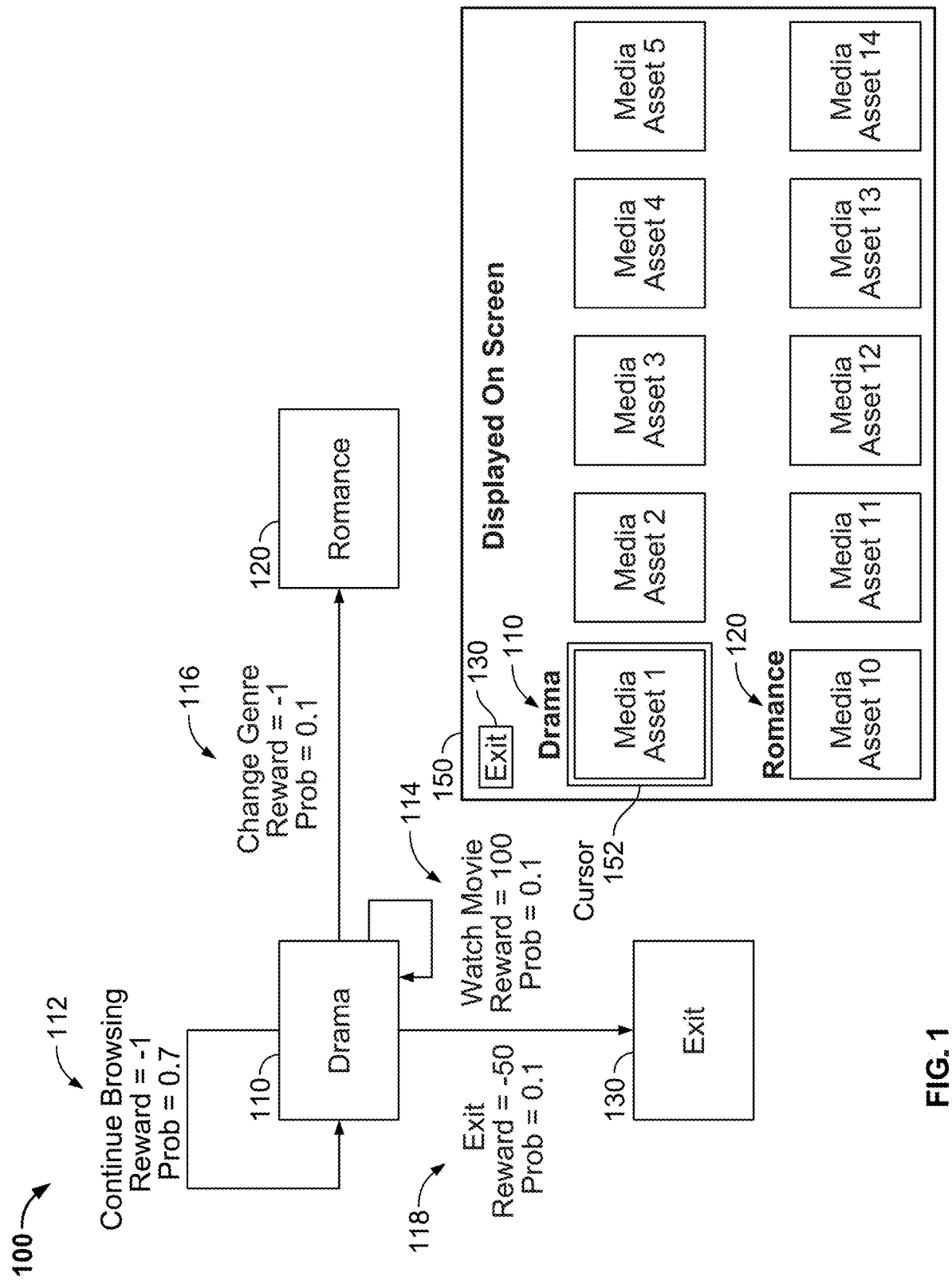
FIG. 1 shows a simplified state transition diagram of a media asset recommendation model used to provide media asset recommendations to a user, along with an example display, in accordance with some embodiments of the present disclosure.

Methods and systems are provided herein for recommending media assets during a user browsing session based on user input that occurs during that browsing session. For example, a media recommendation application may provide a first set of media asset recommendations for display to a user. The user may then scroll, select a title, or provide some other user input. The media recommendation application may then update the recommendations and provide a second set of media asset recommendations to the user, while the user continues to browse or interact with the application.

The amount of content available to users in any given content delivery system can be substantial. Consequently, many users desire a form of media recommendation through an interface that allows users to efficiently navigate content selections and easily identify content that they may desire. An application that provides such guidance is referred to herein as a media recommendation application, recommendation application, interactive media recommendation application or, sometimes, a media guidance application or a guidance application.

Media recommendation applications may take various forms, depending on the content for which they provide recommendations. One typical type of media recommendation application is an interactive television program guide. Interactive television program guides (sometimes referred to as electronic program guides) are well-known recommendation applications that, among other things, allow users to navigate among and locate many types of content or media assets. Interactive media recommendation applications may generate graphical user interface screens that enable a user to navigate among, locate and select content. As referred to herein, the terms "media asset," "title" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. As referred to herein, the term "multimedia"

should be understood to mean content that utilizes at least two different content forms described above, for example, text, audio, images, video, or interactivity content forms. Content may be recorded, played, displayed or accessed by user equipment devices, but can also be part of a live performance. Furthermore, as referred to herein, the terms "state" and "genre" should be understood to mean a category of media assets, titles, or content, and may be used interchangeably.

The media recommendation application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

With the advent of the Internet, mobile computing, and high-speed wireless networks, users are accessing media on user equipment devices on which they traditionally did not. As referred to herein, the phrases "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a television. Consequently, media guidance and/or recommendations may be available on these devices, as well. The guidance and/or recommendations provided may be for content available only through a television, for content available only through one or more of other types of user equipment devices, or for content available through both a television and one or more of the other types of user equipment devices. The media recommendation applications may be provided as online applications (i.e., provided on a website), or as stand-alone applications or clients on user equipment devices. Various devices and platforms that may implement media recommendation applications are described in more detail below.

One of the functions of the media recommendation application is to provide media recommendation data to users. As referred to herein, the phrase "media recommendation data" or "recommendation data" should be understood to mean any data related to content or data used in operating the recommendation application. For example, the recommendation data may include program information, recommendation application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of data that is helpful for a user to navigate among and locate desired content selections.

FIG. 1 shows a simplified state transition diagram of a media asset recommendation model 100 that is used to provide media asset recommendations to a user, along with an example display 150. The simplified state transition diagram of FIG. 1 illustrates a current state in which the model operates (i.e., the drama state 110), as well as a possible next state that the model can transition to (i.e., the romance state 120). The diagram 100 also illustrates an exit state 130 that the model can transition to under certain circumstances. As shown in FIG. 1, when a user is browsing media assets within the drama genre, the current state of the model is the drama state 110. The example display 150 of FIG. 1 illustrates the currently browsed state (i.e., the drama state 110), as well as a cursor 152 which identifies a selected media asset of the currently browsed state.

Each state of the model 100 has a corresponding set of media asset recommendations. These media asset recommendations may be displayed, such as on example display 150, wherein a set of media assets 1-5 is displayed for the drama state 110, and a set of media assets 10-14 is displayed for the romance state 120. These media asset recommendations can be determined using one or more existing systems, models, or algorithms. For example, one set of media asset recommendations may include a list, score, ranking, or ordering of titles within a state (or genre) based on popularity, relevance to the user, user preferences, user information, system information, trending assets, length of the assets, type of assets, and more.

In some examples, the media asset recommendation model 100 may determine the initial set of media asset recommendations based on system-wide data, user data, similar user data, and any other suitable information. The media asset recommendation model 100 may determine a first set of media asset recommendations for each state of the model prior to or in response to the beginning of a browsing session (i.e., when a user logs in).

In some examples, the media asset recommendation model 100 operates in conjunction with one or more machine learning algorithms that can prioritize media asset selection and ordering, including traditional machine learning and deep learning models. For example, media assets associated with a given genre can be ranked in the order of user importance. As an extension, the rewards within a given genre can vary based on the importance to a user. For example, the first media asset displayed for a genre is expected to have high reward, while the $10^{th}$ media asset is expected to have a lower reward. In this scenario, the media recommendation application can consider the reduced reward from the $10^{th}$ media asset and decide to transition from the current state to a next state within the media asset recommendation model as the user scrolls to see additional movies within a state. The media asset recommendation model (otherwise known as a reinforcement learning model) can also learn the average reward correlated to the media asset position and adjust the actions, accordingly, as described in further detail below.

Each state of the media asset recommendation model also includes a plurality of user input options that are available for a user to select. These user input options are browsing actions available to a user, and can include (a) scrolling to next media asset, (b) playing the currently selected media asset, (c) changing to a different state (i.e., genre), and (d) exiting the system. The media asset recommendation model can also detect various other user actions or user interactions such as (e) searching for a title, (f) tracking how long the user spends viewing a given media asset, (g) whether the user accesses additional information about a given asset, (h) whether the user watches a trailer for the asset, and more.

Each user input option has a corresponding user input option value that is used by the media asset recommendation model for various purposes. The user input option value comprises a combination of the reward value associated with the user input option and the selection probability associated with the user input option. When a user exercises an input option, the user may stay in the same state or transition to a new state as shown in FIG. 1. The expectation of rewards for each of these states is the product of the reward associated with the new (or same) state if that user input option is exercised and the probability of achieving that state. In some embodiments, the probability of transitioning to a state may factor in information such as the device used, time of day, location, user profile, and more.

The reward values associated with each user input option are used to optimize the media asset recommendation model, to improve the user experience and to increase user engagement. To that end, the model may generally associate positive rewards with actions that increase engagement, such as selecting a movie or watching a movie for a certain amount of time, and associate negative rewards with actions that decrease engagement, such as scrolling, changing states or genres, and exiting the system.

A first user input option is scrolling. When a plurality of media assets are displayed (e.g., in a carousel), a first asset may be selected, and the user may have the option to scroll left or right to highlight a second media asset. The media recommendation application associates a small negative reward with a scrolling user input option (e.g., −1), because the first asset recommended to the user was not acted upon, and thus the model was not effective in recommending that desired media asset.

A second user input option is watching a media asset. This includes the user selecting the highlighted media asset (e.g., a movie), and causing the media asset to play. The media recommendation application associates a large positive reward with this user input option (e.g., +100), because the model was effective in recommending that media asset to the user. In some examples, the reward may be proportional to the amount of time the user spends watching the movie. For example, the reward may be +50 for starting the movie, and then an additional reward amount up to +50 depending on how far into the movie the user watched, for a total of +100 if the user watched the entire movie. These values are for example only, and one of ordinary skill in the art would understand that the values, weights, and distribution of rewards can change from what is described herein while remaining within the scope of this disclosure.

A third user input option is changing states or changing genres. The media recommendation application may associate this action with a small negative reward (e.g., −1), because the model failed to recommend the right genre to the user.

A fourth user input option is exiting the system entirely. The media recommendation application may associate a large negative reward (e.g., −50) with the exit option. In some examples, the reward associated with the exit option may be a large negative reward (e.g., −50) if a total watching time for the user is below a threshold time during the current browsing session. Alternatively, the reward may be a small negative reward (e.g., −5) when the user has spent a significant amount of time already browsing and/or watching media assets (e.g., when the total watching time is above the threshold).

In some examples, the rewards and selection probabilities associated with each user input option may be determined based on or using a model that was trained using a large dataset. For example, the rewards and/or selection probabilities may be set to default or initial values determined based on all other users, all similar users, all local users, local similar users, or any other set of data. The reward values and/or selection probabilities may be set and/or modified in order to optimize the model to achieve increased user engagement. In some examples, the reward values and/or selection probabilities may be set or modified with other goals in mind, such as for exploration of the media asset recommendation model, exploitation of the media asset recommendation model, and more.

The reward values and selection probabilities may be updated over time as the user interacts with the media recommendation application. For example, a first scrolling event may be associated with a reward of −1, while a subsequent scrolling event is associated with a reward of −0.9, and each subsequent scrolling event has a decreasing small negative reward. This may be referred to as "discounting" rewards or using a "discount factor," to enable the media asset recommendation model to converge, and to prioritize early actions compared to later actions. The media asset recommendation model may put greater reward weight (either positive or negative) on the earlier user input options taken by a user, and put less reward weight on later user input options, particularly where the user takes the same user input option multiple times in a row. Additionally, the selection probabilities associated with each action may change in response to interaction of the user with the media recommendation application. For example, when the user scrolls through the media assets associated with a given state (i.e., movies within a displayed genre), the selection probability associated with the "scroll" user input option for that state may increase each time the user selects the scroll option, while the selection probabilities associated with all other options for that state decrease, such that sum of the selection probabilities across all possible transition states remains constant (e.g., a value of one).

The state value associated with a state may be based on the user input option values associated with that state. For instance, the state value may be a simple addition of all the user input option values associated with the state. In another example, the state value may be an average, weighted average, or some other mathematical combination of the user input option values (and/or other information) associated with the state.

In the examples of this disclosure, the media asset recommendation model comprises a Markov model. However, it should be appreciated that other models may be use as well. Additionally, FIG. 1 shows the model having three states, but it should be understood that there may be many other states and state transitions. In some examples, each state may have the same set of associated user input options (e.g., scrolling, exiting, etc.). In other examples, one or more states may have a different set or subset of associated user input options from one or more other states. The illustrated and described media asset recommendation model can be solved using any traditional reinforcement learning model, including value iteration, policy iteration, Q-learning and more. As the user makes additional choices (e.g., scrolling right to see additional media assets), the model can track the changes by updating the value of each state and the policy at each state. Techniques like deep Q-learning can also be applied to the system to learn the optimal policy given a particular user state.

Figure 2:
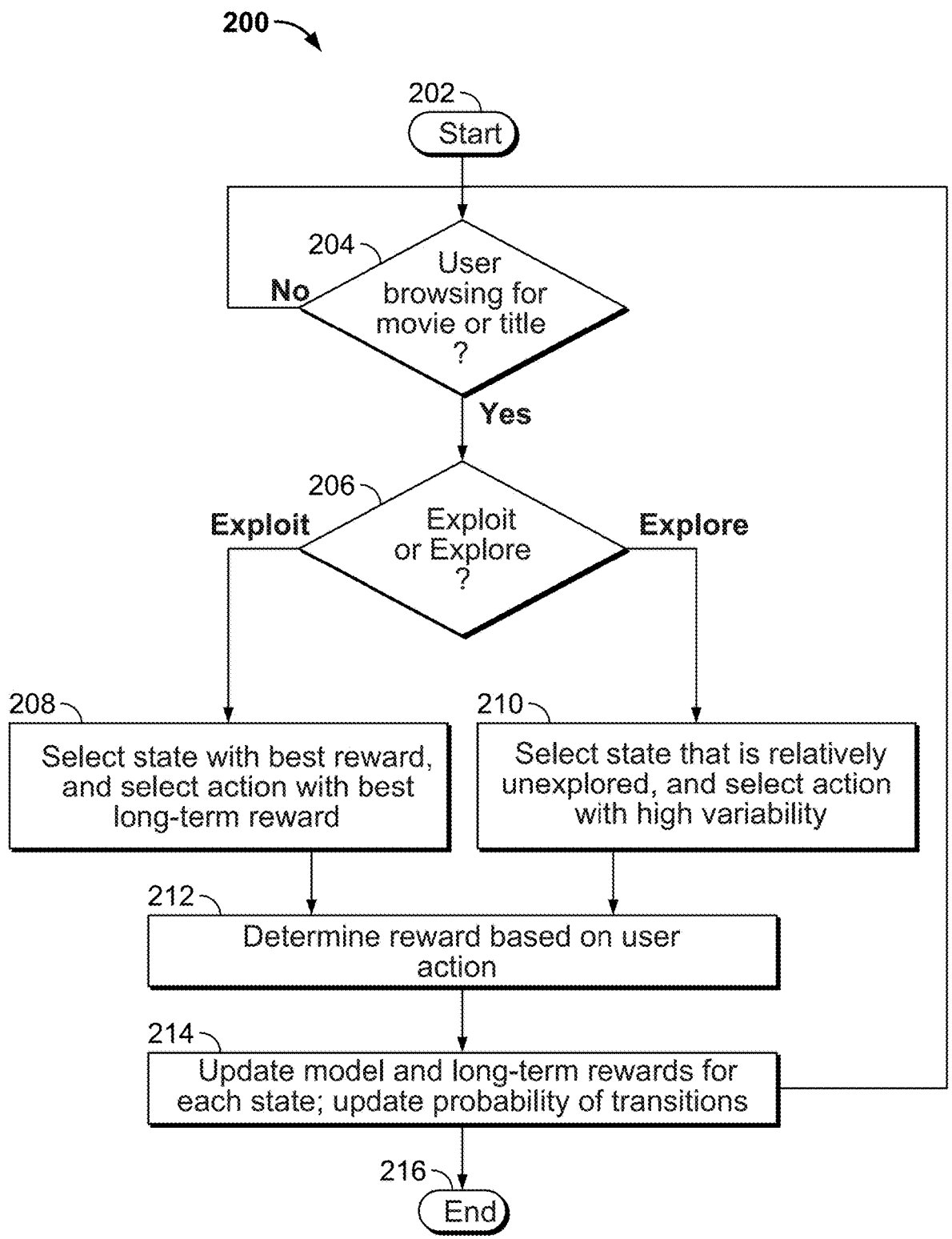
FIG. 2 shows a flowchart of illustrative steps involved in determining whether a next media asset recommendation model is an exploit action or an explore action, in accordance with some embodiments of the present disclosure.

FIG. 2 shows a simplified flowchart of steps involved in operating the media recommendation application, and in particular the steps involved with respect to taking an exploit action or an explore action. While the application operates within a given model state (e.g., the drama state 110 shown in FIG. 1), the application can perform two actions when the user makes certain inputs (e.g., when the user scrolls right). These actions can be used to optimize the model behavior to either exploit the information already available (and thereby provide a more immediate reward), or to explore the states of the model to develop higher confidence in values associated with one or more states.

As a general concept, the media recommendation application makes use of the media asset recommendation model to optimize the long-term engagement and long-term rewards for each user. Deciding whether to exploit the model or explore the model involves a tradeoff between exploitation of data already known or collected by providing recommended media assets resulting in rewards to the system with high confidence, and exploration of states or genres less selected by the user, but that may provide greater long-term rewards if recommended to the user. Without exploration of the model, the model may converge to a local maximum, such that some states or genres are not recommended due to associated low confidence levels, even if in the long run these states or genres would result in greater long-term rewards and user engagement.

In an ideal (but largely impractical) scenario, the media asset recommendation model would include data about a user's preference for every possible media asset. That is, in order to provide the best possible recommendation, the model would need to know everything about the user, so as to determine which state and/or media asset is the perfect recommendation at any given time. The model would have a high confidence level associated with every possible state, and would need to exploit only the information available to make the perfect recommendation. However, since in practice the model must operate using limited information, the model must be explored to improve the confidence level associated with various states. Exploration enables the system to present assets that may or may not be preferred by the user, because these assets are different from or are associated with a different state than the known preferences of the user.

In the media asset recommendation model for a user, some states may be more explored and used than other states. For example, the user may enjoy and routinely browse and watch drama TV shows. Based on constantly watching drama TV shows, the model may only recommend drama TV shows and not recommend action movies or comedy movies. The model for this user has a high confidence value associated with the drama state, and low confidence levels associated with the action state and the comedy state. However, the user may in the long term actually prefer comedy movies, or may have complex tastes that change over time. If the model is only exploited by recommending drama TV shows, the user may be turned off or disengaged from the system because they are not being recommended the ideal set of media assets for their tastes.

The media recommendation application exploits the model by selecting the state (i.e., genre) having a highest or relatively high state value, and with a relatively high associated confidence value. In the scenario above, the media recommendation application would present media assets associated with the drama TV state.

Referring back to FIG. 1, the current state is a drama state 110 and the user is browsing in the drama genre. When the media recommendation application detects a scroll right user input, there may be two possible actions in response: (1) showing an additional drama movie from the drama state 110 or showing a romance movie from the romance state 120. Each of these actions is associated with a discounted value based on the action and the history of the previous rewards. In the exploit scenario, the application chooses the action of recommending a drama movie since the long-term reward for the action of recommending a drama movie is higher than for recommending a romance movie.

Exploration, on the other hand, may include the application providing a recommendation from a different state from the current state. This enables the application to, over time, develop a higher confidence level that the user does or does not enjoy particular states or genres. Each state within the model has a state value (e.g., the average reward for all user input options corresponding to the state). The state value may have a standard deviation associated with it, which may be correlated with a confidence level for the state. For instance, the drama state may be relatively well explored and used by the user, and may thus have a relatively high state reward, a low standard deviation associated with the state reward, and thus a high confidence level. In contrast, the comedy state may be relatively unexplored, but may have a relatively high state reward (based on initial values from the average user). Since the comedy state is relatively unexplored for the target user, the comedy state has a high associated standard deviation, and thus a low confidence level. Thus, while it may appear that the drama state provides the best long-term reward based on current knowledge of the user's preferences, the reality is less clear. As the user interacts with and explores the comedy state more, the standard deviation for the comedy state will decrease, and the confidence level will increase. The comedy state reward value itself will change as the user input option rewards and selection probabilities are updated. As a result, exploration of the comedy state creates a clearer picture of the potential long-term rewards. After performing sufficient exploration, the media asset recommendation model may determine that the comedy state has a higher long-term reward than the drama state, even though the opposite was true based on the limited initial information about the user.

In some examples, the media recommendation application decides to present the state that results in the highest long-term rewards, meaning some of the potential states a user may be interested in will go unexplored. In other examples, the media recommendation application decides, based on selecting an explore option, to present a state that has a high variability in the predicted long-term rewards. This may occur where a user has chosen a movie from a particular genre, but in the long term does not often intend to choose from this genre. The media recommendation application can select the explore option with a high probability during the initial stages of a user (i.e., when there is limited information known about the user and their preferences), and may decay as higher confidence is achieved on the probability and rewards for each state.

Referring to FIG. 2, a simplified flowchart illustrates the media recommendation application operation with respect to exploration and exploitation of the media asset recommendation model. The process starts at step 202.

At step 204, the process 200 includes determining whether the user is browsing for a media asset (e.g., a movie, TV show, or other title). If the user is not browsing for a media asset, then the process remains at step 204 to wait for a positive determination that the user is receptive to a media asset recommendation.

If the user is browsing for a media asset at step 204, at step 206 the process 200 includes determining whether to exploit or explore the information in the media asset recommendation model associated with the user. The concepts of exploring and exploiting the model are described in detail above. As noted above, the media recommendation application may incentivize maximizing the long-term rewards gained through user interaction with the application, which can mean performing a mixture of both (a) exploitation of the model to achieve rewards with a high confidence level, and (b) exploration of the model to improve the confidence level associated with less-explored states. The overall goal of the media recommendation application may be to maximize rewards, and to have high confidence that the model recommendations result in the best possible long-term rewards (e.g., high engagement, user satisfaction, etc.).

Step 206 includes determining whether the application should exploit the model or explore the model based on the confidence levels associated with various states, the standard deviation of rewards associated with various states, and the overall goals of the media recommendation application. To that end, the media recommendation application may change its goals over time, such that the application may select exploration at step 206 with a higher probability early on in the lifetime of a user's account when less is known about the user's preferences, and reduce the probability of selecting exploration over time (e.g., the application may select exploration with a 50% probability to start, and then reduce the probability to 20% or less over time as the model for the user is filled in with known preferences of the user). Additionally, the media recommendation application may set or modify the probability that exploration is selected based on user profile information, such as whether the user is receptive to new genres and recommendations, or whether the user wishes to be presented with new recommendations in order to improve the model's recommendations to the user.

If the media recommendation application decides to exploit the information in the model at step 206, step 208 of the process 200 includes selecting a state with the best state reward, and selecting an action with the best predicted long-term reward. The selected state with the best state reward may be the state with the highest state value, wherein the state values are determined by combining the expected rewards for each user input option multiplied by the selection probability of the user input option). For example, if a user's most-watched genre is comedy movies, the application may select the comedy state at step 208. The application can consider various factors in addition to the most-watched genre, such as the time of day, device used, device location, and trending or popular selections for (a) other similar users, (b) all other users, (c) close by users, (d) close by similar users, and more.

Selecting the action with the best long-term reward can include selecting a set of media asset recommendations corresponding to the selected state that result in the best long-term reward. This can include selecting both the media assets included in the set of recommendations, as well as the order of presentation (i.e., ranking) of those selected media assets. For example, the application may select a set of movies with the highest likelihood of being watched (i.e., the movies that include the highest probability of a user action being to play the selected media asset). Additionally, the application may rank the set of movies according to the likelihood of being played by the user.

In other words, in response to determining that the next media recommendation application action is an exploit action, the media recommendation application may be configured to switch from the current state to an exploit state having a highest state value, determine a third set of media asset recommendations for the exploit state based on a predicted long-term system reward associated with the exploit state, and provide the third set of media asset recommendations to the user.

Instead, if the application selects the explore option at step 206, step 210 of the process 200 includes the application selecting a state that is relatively unexplored, and selecting an action with an associated high variability. For example, the application may select a relatively unexplored state having an associated low confidence level and high standard deviation of expected rewards. The application may also select a set of media asset recommendations that have a high variability, and/or a low confidence level associated with whether the user is likely to select the assets or not. In some examples, the application may select a set of media assets (and order of presentation of the set of media assets) that include a standard set of assets. The particular selected media assets may act as a barometer or bellwether that provides the best improvement in confidence associated with the states of the model. For instance, by analyzing other users' preferences, the application may determine that a user's ratings with respect to media assets A, B, and C provide the best indication of whether that user prefers assets from a state, and thus provides the best indication of what the predicted long-term rewards for the state will be. The media recommendation application may present media assets A, B, and C during exploration of the state, in order to best improve the model's associated confidence level for that state. Put another way, certain media assets for a given state may be guideposts or indicators that, when interacted with by the user, provide a high confidence level in how the user will interact with other media assets of that state. By presenting only these guidepost media assets, the application can improve its understanding of the user's preferences with the least amount of additional presentation of media assets from less-explored states.

In other words, in response to determining that the next media recommendation application action is an explore action, the media recommendation application is configured to switch from the current state to an explore state having a low confidence level associated with a state value of the explore state, determine a fourth set of media asset recommendations based on the explore state, and provide the fourth set of media asset recommendations to the user.

Although not shown, process 200 may also include the application presenting the set of media asset recommendations to the user. The user may then interact by selecting a user input option, such as scrolling, changing genres, watching a selected media asset, exiting, or taking some other action.

At step 212, the process 200 includes determining a reward based on the received user input option. For example, if the user watches the recommended media asset, a large positive reward is granted. If the user scrolls, changes genres, or exits, a negative reward is granted. This is discussed in greater detail above.

At step 214 the process 200 includes updating the media asset recommendation model and rewards for each state, as well as the selection probability for each user input option associated with the current state. The selection probabilities may be updated based on the user input option that was selected, in order to reflect the new selection probabilities. The reward values may be updated based on the media asset that was selected, for instance by increasing the reward value associated with the state.

Process 200 may then proceed back to step 204, to continue in a loop as long as the user browses for a media asset to view. In some examples, the process 200 may continue until there is no user input for some threshold time (e.g., five minutes), the user exits the application, or some other ending condition is met.

Figure 3:
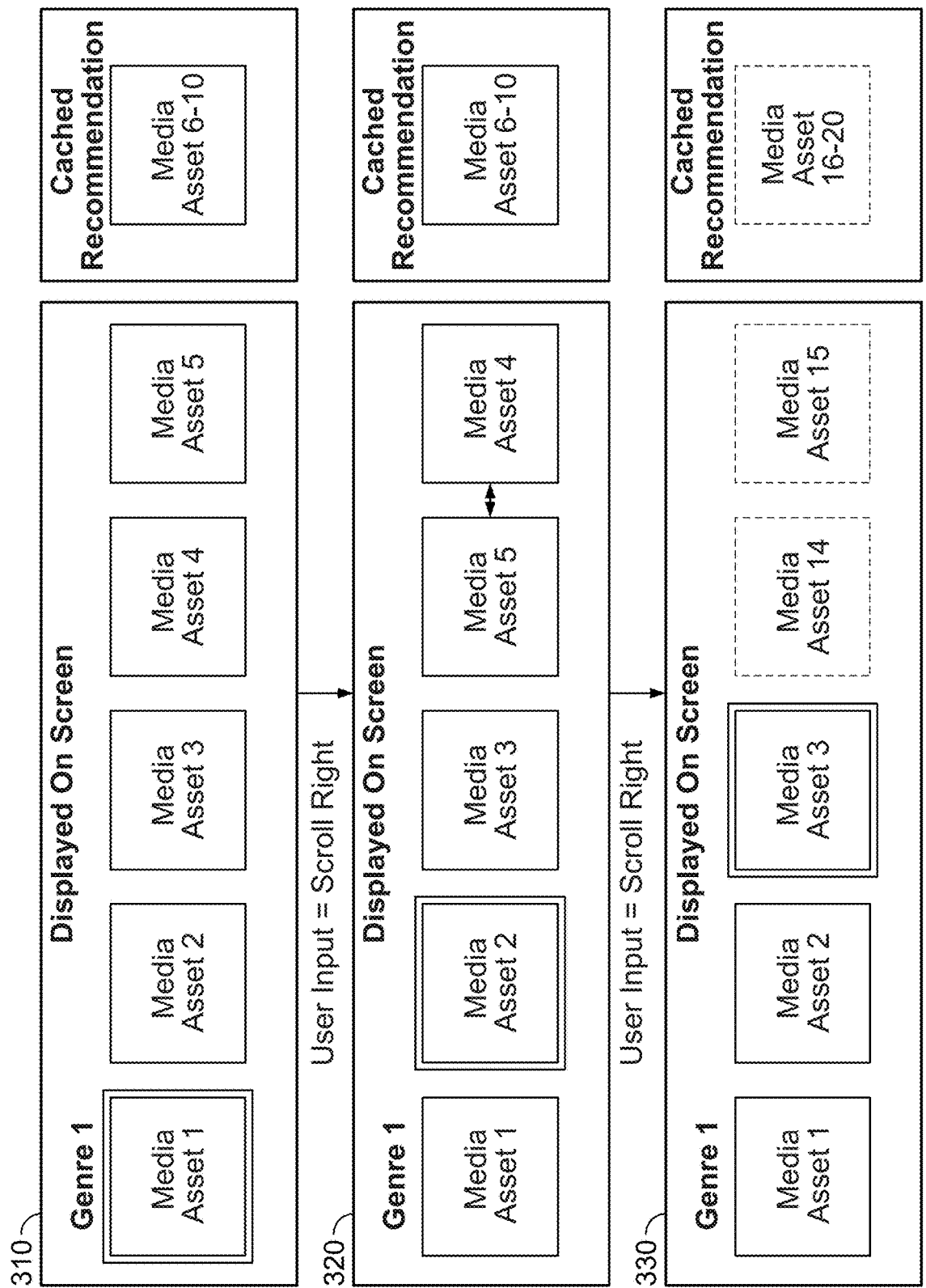
FIG. 3 shows an illustrative embodiment of a set of simplified display screens providing respective sets of media asset recommendations, showing how the display screen changes based on user input, in accordance with some embodiments of the present disclosure.
Figure 4:
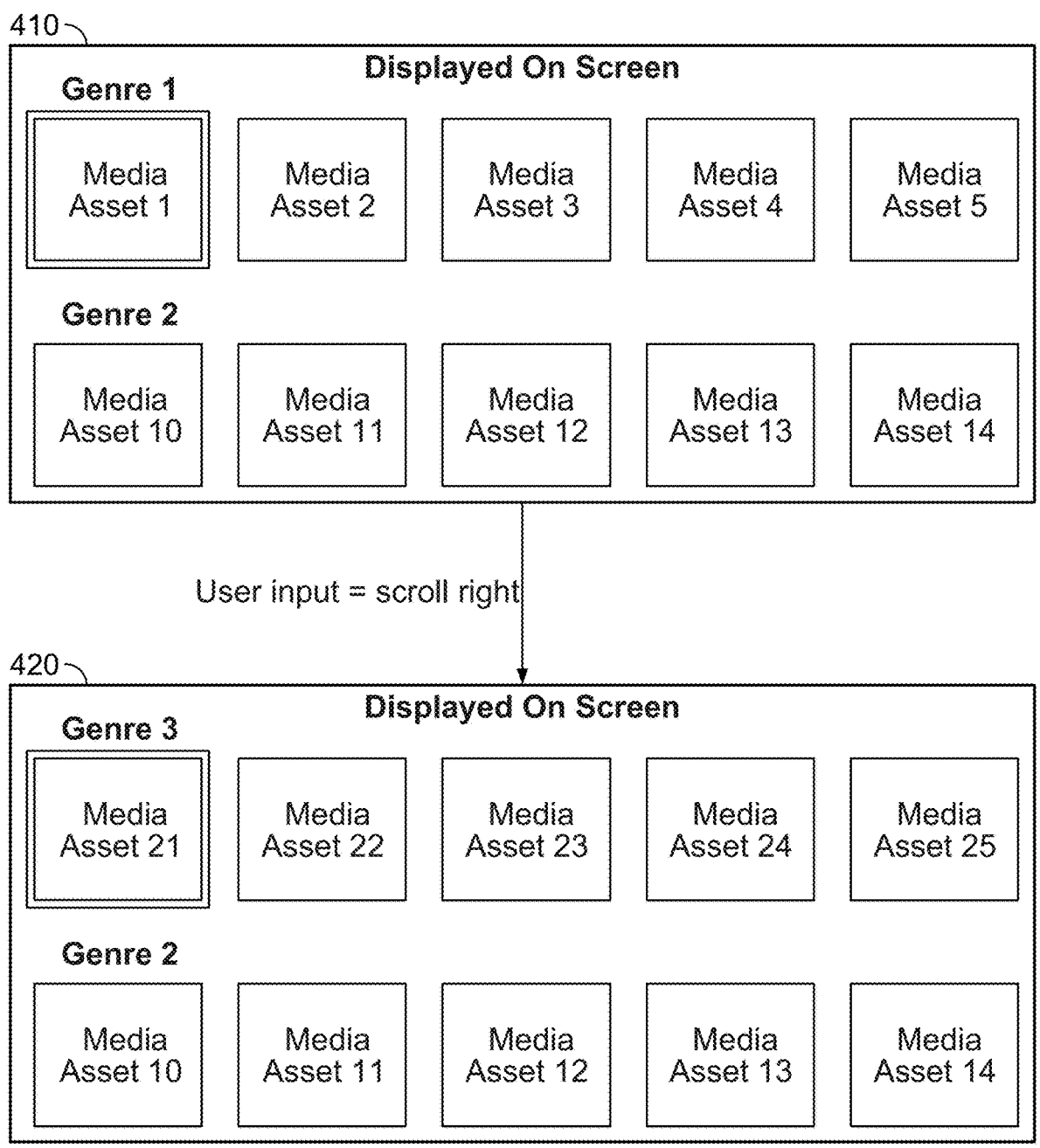
FIG. 4 shows another illustrative embodiment of how a display screen providing a set of media asset recommendations changes based on user input, in accordance with some embodiments of the present disclosure.
Figure 5:
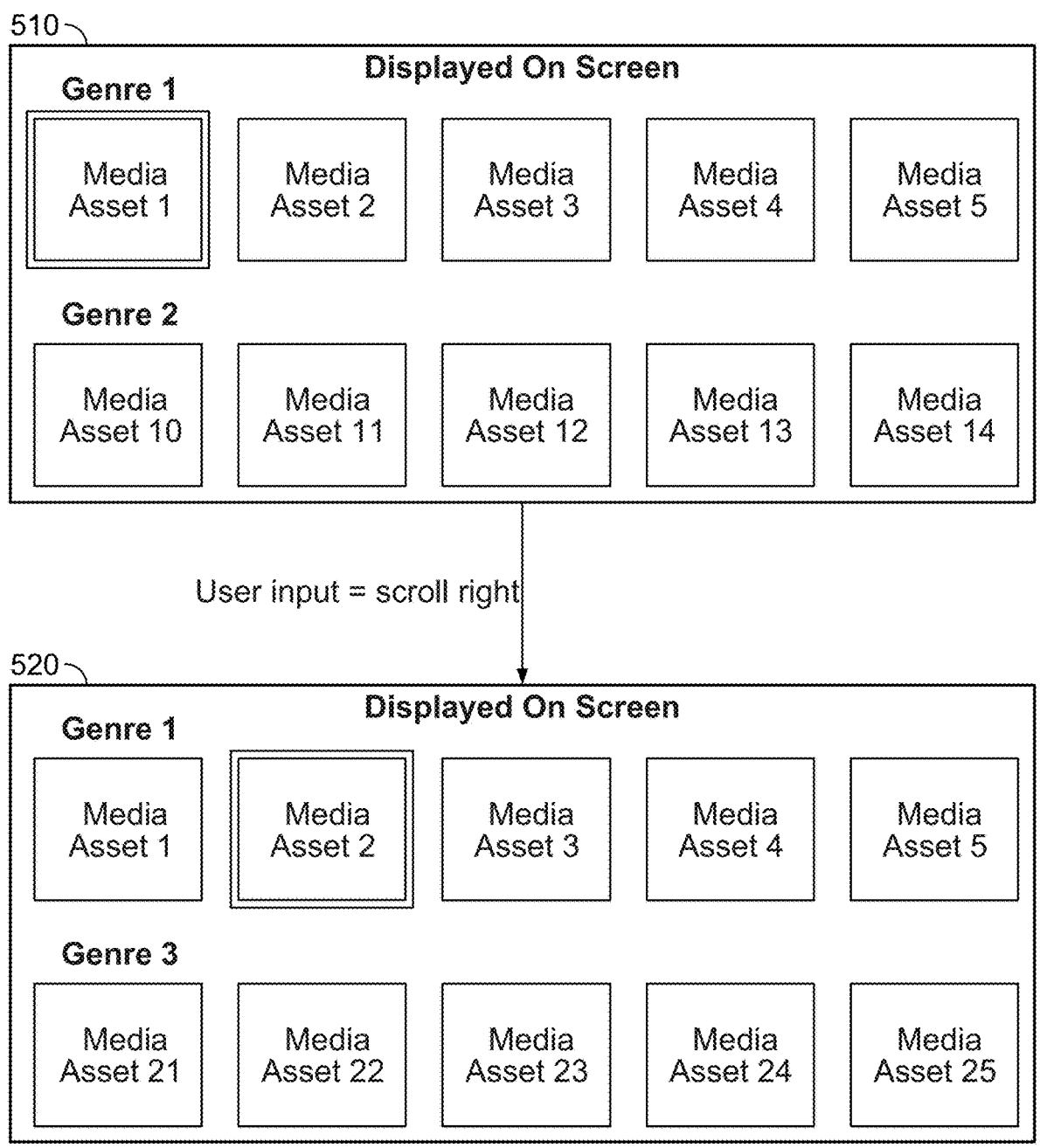
FIG. 5 shows a further illustrative embodiment of how a display screen providing a set of media asset recommendations changes based on user input, in accordance with some embodiments of the present disclosure.

FIGS. 3-5 illustrate example sets of displays that show various media asset recommendations, and illustrate how the display of media asset recommendations changes in response to various user inputs.

In some examples, a media recommendation application is configured to access a media asset recommendation model comprising a plurality of states (e.g., simplified model 100 described with respect to FIG. 1). The media recommendation application is configured to determine a current state corresponding to the user. The current state may be the state or genre the user is currently browsing (e.g., drama). The current state may be the initial state upon startup of the media recommendation application, the initial state upon the user logging in or beginning the browsing session, or the state that the user selects (e.g., when the user changes from one genre to another).

The media recommendation application is then configured to provide a first set of media asset recommendations to the user based on the current state. For example, where the current state is the drama state, the media recommendation is configured to provide a set of media assets that correspond to the drama state. The current state may refer to the genre that is currently selected by the user. A set of media asset recommendations can include a list of titles of movies or other media assets that correspond to the current state. A given media asset may fall into several different genres, and thus may be associated with several different states. The set of media asset recommendations can also include the order or ranking of media assets that are associated with the current state. For example, the media assets may include a number of assets that fall into the drama category, and these assets may be ranked or ordered based on popularity, number of plays by similar users or all users, the expected reward granted if the user plays the asset, the expected time or percentage of the asset that will be viewed by the user, etc. In some examples, the media recommendation application may employ existing algorithms, models, and/or decision-making processes to determine the first set of media asset recommendations to provide to the user.

In some examples, a set of media asset recommendations may include one or more subsets or groupings of media assets. The first subset of media assets may be provided to the user for immediate display, while the second subset of the media assets is provided for storage in a cache, and only displayed after the user has scrolled or provided some additional input. In one example, the first subset of media assets provided for immediate display are shown on the screen to the user. Display screen 310 in FIG. 3 illustrates the first subset of media assets 1, 2, 3, 4, and 5 displayed to the user in a carousel on the screen. As described herein, the media recommendation application may display media assets in a carousel format, such that a limited number of media assets are displayed at any given time, and additional media assets can be accessed by scrolling to the right or the left along the carousel. In some examples, the carousel may include placeholders that can be populated with media assets when the user scrolls.

After the media recommendation application provides the first set of media asset recommendations for display to the user, the application may be configured to receive a user input option from the user. As described above, the user input options can include actions taken by the user during the browsing session, such as (a) scrolling to a next media asset recommendation within the current genre, (b) playing a currently selected media asset, (c) changing from the current genre or state to a next genre or state, and (d) exiting the application. Other user input options may include (e) searching for a title, (f) spending a tracked amount of time viewing a given media asset, (g) accessing additional information about a given asset such as the credits, (h), watching a trailer for the media asset, and more. The user may input the user input option to the media recommendation application using a remote control, keyboard, touch-screen, voice input, gesture input, or any other suitable user interface device.

In response to receiving the user input option, the media recommendation application is configured to determine a second set of media asset recommendations for the current state based on the received user input option. The second set of media asset recommendations may include the same or different media assets from the first set of media asset recommendations. The second set of media asset recommendations may also include a reordering or re-ranking of the media assets. For example, in determining the second set of media asset recommendations, the application may replace one or more media assets with different media assets that are more likely to be watched based on the received user input option. In another example, the second set of media asset recommendations may include the same media assets as the first set of recommendations, but with a different ranking or order of display of the media assets. A combination of new media assets and new ranking of media assets is possible as well.

In some examples, the media recommendation application may determine the second set of media asset recommendations in real time in response to the user input option, before a second user input option is received. The application may update the media asset recommendation model and recommendations based on the model on-the-fly, such that the user is continually presented with updated recommendations.

In other examples, the application may update the model and media asset recommendations based on the model in response to the user exiting the application. When the user exits the application, data about the user's browsing session may be transmitted to a server for processing, and the model may be updated at this time.

In one example, the media recommendation application is configured to determine an updated media asset recommendation model in response to receiving the first user input option. Updating the model can include modifying one or more selection probabilities, reward values, and more, as discussed above. The application can then determine the second set of media asset recommendations for the current state based on the received first user input option and the updated media asset recommendation model. For example, a first user input option may be to change from an initial state to a next state. The application will update the model to reflect a lower reward for the initial state and a higher reward for next state, based on the user's selection of the next state.

The user switching states may also indicate a greater propensity of the user to watch media assets from a wide variety of genres. This information can be used along with the updated model values to determine the second set of media asset recommendations the application provides.

After determining the second set of media asset recommendations, the application is configured to provide the second set of media asset recommendations to the user. The second set of media asset recommendations can be provided in real time during the browsing session, after the first user input option is received and before a second user input option is received. As noted above, a first subset can be provided for immediate display to the user, and a second subset can be provided to be stored in a cache (such as on a user device) for later display to the user.

FIG. 3 illustrates how the display seen by a user may change over time as the user scrolls through the media assets of a genre. Display 310 includes a first subset of media assets 1, 2, 3, 4, and 5 displayed in a carousel. The selection icon is placed on media asset 1. Media assets 6, 7, 8, 9, and 10 (e.g., the second subset) are stored in a cache for later display to the user when the user scrolls far enough from the initial selection icon position. In response to a user input, the media recommendation application may determine a modified first subset, a modified second subset, or a combination of both.

Display 320 of FIG. 3 illustrates the display after the user has scrolled to the right. The rightward scroll user input option moves the selection icon to the right, placed on media asset 2. In response to the rightward scroll user input option, the media recommendation application determines that media asset 5 is more likely to be viewed by the user than media asset 4. The media recommendation application changes the ranking of media assets 4 and 5 and swaps their position on the display, as shown in FIG. 3. Display 320 shows that the second set of media asset recommendations provided to the user includes the same media assets, but with a different ranking. The first set of media asset recommendations (media assets 1-10 shown with respect to display 310) comprises a first subset available for immediate display (media assets 1-5) and a second subset available for display after additional user input (media assets 6-10). After the rightward scroll user input is received, the media recommendation application determines the second set of media asset recommendations by determining a modified first subset (e.g., reranking media assets 1-5) based on the received user input option, but leaving the second subset as originally determined (i.e., media assets 6-10). The media recommendation application then provides the second set of recommended media assets to the user by providing for display the modified first subset (i.e., reranked media assets 1-5) and the second subset (i.e., originally ranked media assets 6-10).

In another example, determining the second set of media asset recommendations for the current state based on the received user input option comprises determining a modified second subset based on the received user input option, and providing the second set of recommended media assets to the user comprises providing for display the first subset and the modified second subset. When presented with the display 320 in FIG. 3, the user may make a further input such as a second rightward scroll. In response, the media recommendation application may determine a new set of media asset recommendations to provide to the user. In FIG. 3, the new set of media asset recommendations includes a modified first subset (e.g., media assets 1, 2, 3, 14, and 15), and a new second subset (e.g., media assets 16-20). FIG. 3 illustrates the third display screen 330 after the user has input the second rightward scroll, showing the modified first subset displayed on the carousel and the new second subset stored in a cache for later display.

In some examples, the media recommendation application is configured to determine, for each state, initial values for (a) the set of media asset recommendations, (b) the reward values for each user input option available in the state, and (c) the selection probabilities for the user input options available in the state. These initial values may be based on user profile information associated with the user, default values, averages for all users of the application, averages for similar users, location-based user averages, location-based similar user averages, the type of device used, user interests, user age, user demographic information, and more.

In some examples, the media recommendation application is configured to switch states based on an expected or predicted long-term reward. Increased user engagement is desirable, and the expected or predicted long-term rewards associated with a given genre may correlate with user engagement. If a long-term reward for the current state decreases (e.g., in response to continuous user scrolling or other user input options with negative rewards), the application may switch the current state or genre so as to present a state with an expected better reward, better fit for the user interests, and better probability of increasing user engagement. To that end, in some examples, the media recommendation application is configured to determine a first predicted long-term system reward corresponding to the current state and determine a second predicted long-term system reward corresponding to a next state. In response to determining that the second predicted long-term system reward is greater than the first predicted long-term system reward, the media recommendation application switches from the current state to the next state. The predicted long-term reward for a state can be a combination of the state value and the confidence value associated with the state, or any other suitable function.

In response to switching from the current state to the next state, the media recommendation application may cause a user interface associated with the user to change one of a text, image, color, highlight, or shading.

FIGS. 4 and 5 illustrate example techniques for making changes to the display.

Using the media asset recommendation model, the media recommendation application may determine it is beneficial to change states or genres and present media assets from a different genre than is currently selected. The application may determine this based on a predicted reward, or a likelihood that the user will select one or more media assets for viewing. During a browsing session as the user scrolls right, the likelihood of an asset being a match for the user decreases. As such, if the user continues to scroll right within a genre, the application may determine to change genres rather than continuing to present media assets that have less and less likelihood of being viewed. The new genre presented may enable the presentation of media assets that are more likely to be selected and viewed by the user.

FIG. 4 illustrates a first example wherein the display presented to the user is changed. A first display 410 presents two example genres and two sets of corresponding recommended media assets (media assets 1-5 for genre 1 and media assets 10-14 for genre 2). FIG. 4 illustrates that upon detecting a user input option to scroll right, the media recommendation application replaces genre 1 with genre 3, and correspondingly replaces media assets 1-5 with media assets 21-25. This is shown in display 420. The media recommendation application determined that genre 3 and media assets 21-25 are more likely to result in a positive reward, and thus an increase in user engagement and satisfaction. Even though the user selected a rightward scroll user input, the selection icon remains in the leftmost position, centered on media asset 21. The user may not be immediately aware that the genre has changed, and as such the display of genre 3 may also include a change of the text (i.e., displaying genre 3 instead of genre 1), a change of the color or color scheme, a change of the highlighting or shading of one or more aspects of the display, and more. The change from genre 1 to genre 3 (and the corresponding media assets) can occur based on the user input option being a scroll to the right, or some other user input, or without any further input from the user. To the user, it may appear that the application has automatically updated and changed the display on its own in response to the scroll input.

FIG. 5 illustrates another example where the media recommendation application changes the displayed genre and corresponding media assets. Display 510 includes genre 1 and genre 2 displayed along with their corresponding recommended media assets in respective carousels (1-5 and 10-14 respectively). In response to a user scrolling right within genre 1, the media recommendation application may replace genre 2 with genre 3 (and replace media assets 10-14 with 21-25). This is shown in FIG. 5 as display 520. In this way, the user can continue to scroll through the media assets of genre 1, while genre 3 is moved into view just below. Similar to FIG. 4, the media recommendation application may determine that the media assets from genre 3 are more likely to be watched by the user than those of genre 2 (and/or genre 1), and thus determine to present genre 3 and its media assets to the user. But rather than replacing the genre currently being browsed (genre 1) with the new genre (genre 3), the new genre (genre 3) is simply inserted or moved into place below the currently browsed genre (genre 1).

Although FIGS. 4 and 5 illustrate example changes to the display that can occur in response to user input, other changes are possible as well. FIG. 4 illustrates the replacement of the genre currently being browsed with a more relevant genre. FIG. 5 illustrates the addition or insertion of a more relevant genre below the genre currently being browsed. In other examples, the more relevant genre may replace or be inserted above the genre currently being browsed, the more relevant genre may replace or be inserted in a non-adjacent row to the genre currently being browsed, or any other suitable replacement or insertion. Additionally, the more relevant genre being added or replacing a displayed genre can be displayed with a different scaling or sizing, different color, shading, highlighting, or any other visual change. In some examples, the display change may include a change based on the device or display size used by the user. For instance, where the display only includes two genres (as in FIGS. 4 and 5), the more relevant genre or replacement genre may replace or be inserted as shown in FIGS. 4 and 5. Alternatively, where the display is large enough to include three or more genres, the more relevant genre or replacement genre may replace any of the three or more rows, and/or be inserted between any of the rows.

As noted above, the media recommendation application may change the display in response to scrolling input from the user. In some examples, the media recommendation application may change the display in response to determining that the state reward for the currently browsed state is below the state reward for another state. In another example, the media recommendation application may change the display in response to determining that the average reward for the media assets currently displayed with respect to the currently browsed state (i.e., the N currently displayed media assets) is (a) below a threshold amount, and/or (b) below the average reward for the first N media assets recommended to the user for a different state. For instance, if the five currently displayed movies for genre 1 have an average expected reward of 10, while the first five recommended movies in genre 2 have an average expected reward of 15, the media recommendation application may use this determination as a trigger to change the display to display genre 2.

In some examples, the media recommendation application may change the display in response to receiving a threshold number of inputs (e.g., 10 or more scrolling inputs). The threshold number of inputs may change depending on the genre. For instance, the user may scroll more often within genre 1 than in genre 2, and the threshold number of scrolling inputs needed to trigger a change to the display may differ based on which genre is currently being browsed.

In some examples, the media recommendation application may determine a more relevant genre, replacement genre, or next genre based on one or more factors. In one example, the media recommendation application may select the state or genre with the highest state value. In another example, the media recommendation application may select a state or genre that has the highest average reward for the first N media assets recommended for the state (i.e., the average reward for the top N media assets as opposed to the average reward for all media assets in the genre). The number N of media assets may change depending on the user device, display size, and more, and may reflect the number of media assets displayed at any given time for the genre. In still other examples, the media recommendation application may replace or insert two or more genres.

In some examples, the media recommendation application may mix genres, or display media assets from two or more different genres within the same carousel.

In some examples, the media recommendation application may carry out the display change practically by receiving a request and transmitting various data. For instance, the configuration data to seamlessly integrate media assets from genre 2 into a carousel that represents genre 1 can be dynamically generated and sent to the user device during the initial set-up of the browsing session. For example, configuration data may describe the event or events (e.g., the number of scroll inputs) that will trigger the user device to transmit a request (e.g., an XMLHttpRequest) to update a portion of the user interface of the user device (e.g., update a portion of the carousel for a genre). Updating in this context may include replacing existing content being displayed, or even replacing originally slotted content items that were supposed to be sent by the server (e.g., changing media asset 20 to media asset 30 if the user requests such content by scrolling past media asset 19). The update to the content of the display is based on real-time navigation and user action and may include real-time update technologies (e.g., AJAX, etc.) to update specific portions of the user interface (e.g., carousel).

In one example, placeholder media asset positions (e.g., tiles) that represent media assets that would be displayed when the user scrolls right are transmitted to the user device as part of a static webpage, while the actual content (e.g., media assets themselves) are dynamically changed based on user action. In some cases, the media recommendation application may also prefetch the media assets for when the user scrolls right, since the alternate genre to display to the user is already known.

In another example, "filler" tiles are pre-inserted in at least one carousel at a predetermined location (e.g., at a particular index) based on the carousel's category or genre. These tiles may be automatically updated (e.g., via an XMLHttpRequest) when each tile comes into view on the display, or as the user scrolls towards it. The criteria to fill or request content for such filler tiles is dependent on scrolling events with the carousel that it is associated with.

In some examples, the media recommendation application is configured to make a prediction about what the next user input option will be. In one example, the media recommendation application predicts that the next user input option is to exit the application. This prediction may be made based on historic user inputs over time, as well as various other pieces of information (time of day, user device, last title viewed, etc.). In response to predicting that the user input option will be an exit action, the media recommendation application is configured to, before receiving the user input option, (a) switch from the current state to an exploit state having a highest state value, (b) determine a third set of media asset recommendations for the exploit state, and (c) provide the third set of media asset recommendations to the user. For step (b), the media recommendation application may attempt to keep the user engaged with the application by recommending media assets that have the highest likelihood of being watched by the user. The application may present these media asset(s) to the user by inserting or replacing one or more media assets on the display.

In another example, the media recommendation application is configured to predict that a next user input option will be a genre change. This prediction may be made based on historic user inputs over time, as well as various other information (time of day, user device, last title viewed, etc.). In anticipation of receiving a genre change user input, the media recommendation application may be configured to display media assets from a different genre from the currently viewed genre, and/or to reorder or change the titles displayed for one or more genres. By automatically modifying the displayed titles before the user decides to make a genre change input, the application may anticipate the user's preferences and provide more relevant titles for display to the user. This can increase user satisfaction and engagement.

Figure 6:
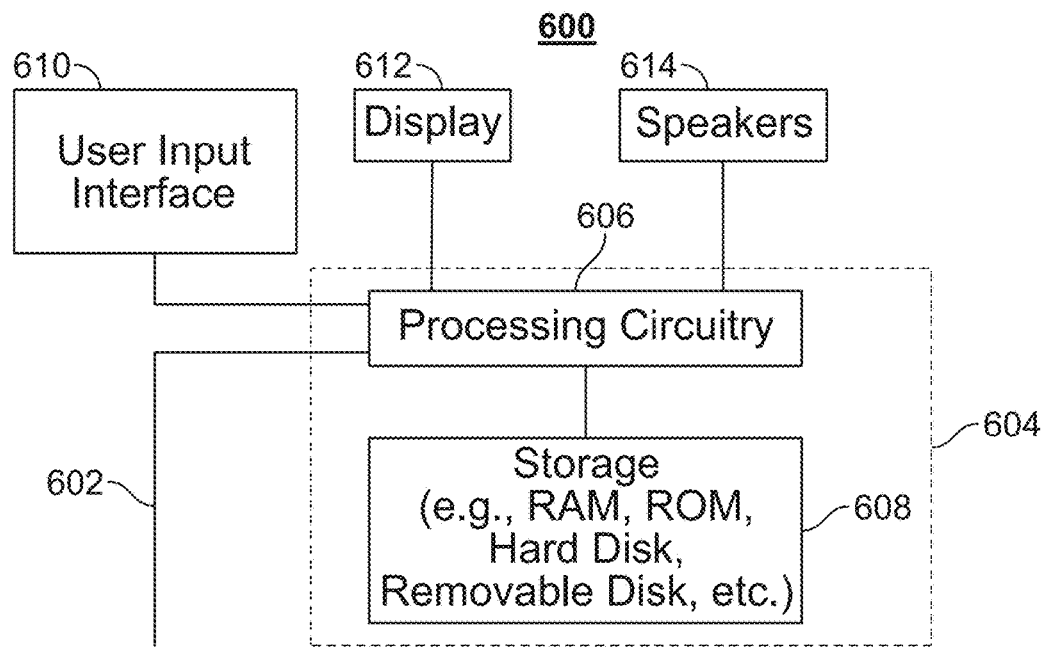
FIG. 6 is a block diagram of an illustrative user equipment (UE) device, in accordance with some embodiments of the present disclosure.
Figure 7:
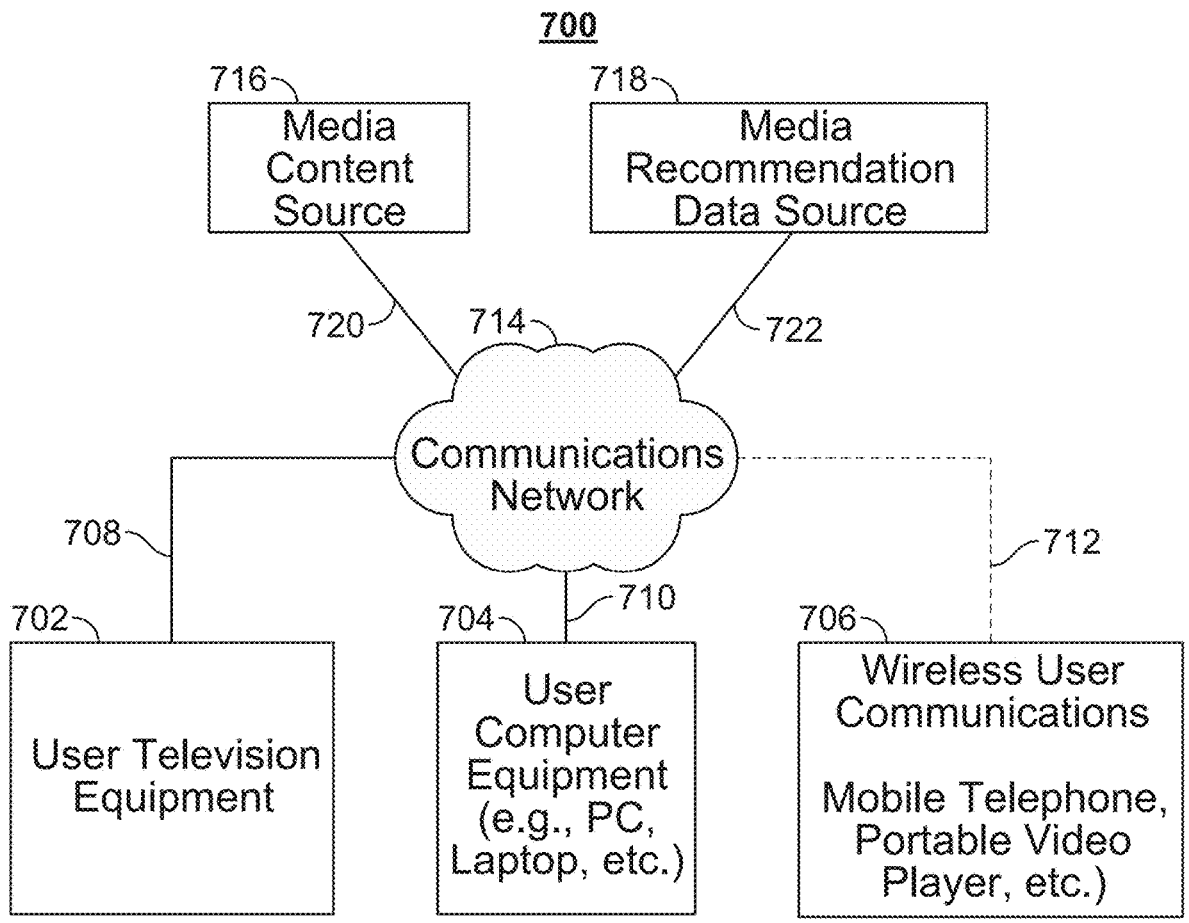
FIG. 7 is a block diagram of an illustrative media system, in accordance with some embodiments of the present disclosure.

FIGS. 6 and 7 are now described. Users may access content and the media recommendation application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output ("I/O") path 602 and corresponding I/O circuitry. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602 and corresponding I/O circuitry. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media recommendation application stored in memory (i.e., storage 608). Specifically, control circuitry 604 may be instructed by the media recommendation application to perform the functions discussed above and below. For example, the media recommendation application may provide instructions to control circuitry 604 to generate the media recommendation displays. In some implementations, any action performed by control circuitry 604 may be based on instructions received from the media recommendation application.

In client-server based embodiments, control circuitry 604 may include communications circuitry suitable for communicating with an application server or other networks or servers. The instructions for carrying out the above mentioned functionality may be stored on the application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media recommendation data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive recommendation data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media recommendation application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The recommendation application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media recommendation application is a client-server based application. Data for use by a thick or thin client implemented on user equipment device 600 is retrieved on-demand by issuing requests to a server remote to the user equipment device 600. In one example of a client-server based recommendation application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media recommendation application is downloaded and interpreted or otherwise run by an interpreter or virtual machine (run by control circuitry 604). In some embodiments, the recommendation application may be encoded in the ETV Binary Interchange Format (EBIF), received by control circuitry 604 as part of a suitable feed, and interpreted by a user agent running on control circuitry 604. For example, the recommendation application may be an EBIF application. In some embodiments, the recommendation application may be defined by a series of JAVA-based files that are received and run by a local virtual machine or other suitable middleware executed by control circuitry 604. In some of such embodiments (e.g., those employing MPEG-2 or other digital media encoding schemes), the recommendation application may be, for example, encoded and transmitted in an MPEG-2 object carousel with the MPEG audio and video packets of a program.

User equipment device 600 of FIG. 6 can be implemented in system 700 of FIG. 7 as user television equipment 702, user computer equipment 704, wireless user communications device 706, or any other type of user equipment suitable for accessing content, such as a portable or non-portable gaming machine. For simplicity, these devices may be referred to herein collectively as user equipment or user equipment devices, and may be substantially similar to user equipment devices described above. User equipment devices, on which a media recommendation application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media recommendation application may have the same layout on various different types of user equipment or may be tailored to the display capabilities of the user equipment. For example, on user computer equipment 704, the recommendation application may be provided as a web site accessed by a web browser. In another example, the recommendation application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media recommendation application settings across in-home devices and remote devices. Settings include those described herein, as well as channel and program favorites, programming preferences that the recommendation application utilizes to make programming recommendations, display preferences, and other desirable recommendation settings. For example, if a user sets a channel as a favorite on, for example, the web site www.allrovi.com on their personal computer at their office, the same channel will appear as a favorite on the user's in-home devices (e.g., user television equipment and user computer equipment) as well as the user's mobile devices, if desired. Therefore, changes made on one user equipment device can change the experience on another user equipment device, regardless of whether they are the same or a different type of user equipment device. In addition, the changes made may be based on settings input by a user, as well as user activity monitored by the recommendation application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media recommendation data source 718 coupled to communications network 714 via communication paths 720 and 722, respectively. Paths 720 and 722 may include any of the communication paths described above in connection with paths 708, 710, and 712. Communications with the content source 716 and media recommendation data source 718 may be exchanged over one or more communications paths, but are shown as a single path in FIG. 7 to avoid overcomplicating the drawing. In addition, there may be more than one of each of content source 716 and media recommendation data source 718, but only one of each is shown in FIG. 7 to avoid overcomplicating the drawing. (The different types of each of these sources are discussed below.) If desired, content source 716 and media recommendation data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media recommendation data source 718 may provide media recommendation data, such as the media recommendation data described above. Media recommendation data may be provided to the user equipment devices using any suitable approach. In some embodiments, the recommendation application may be a stand-alone interactive television program guide that receives program guide data via a data feed (e.g., a continuous feed or trickle feed). Program schedule data and other recommendation data may be provided to the user equipment on a television channel sideband, using an in-band digital signal, using an out-of-band digital signal, or by any other suitable data transmission technique. Program schedule data and other media recommendation data may be provided to user equipment on multiple analog or digital television channels.

In some embodiments, recommendation data from media recommendation data source 718 may be provided to users' equipment using a client-server approach. For example, a user equipment device may pull media recommendation data from a server, or a server may push media recommendation data to a user equipment device. In some embodiments, a recommendation application client residing on the user's equipment may initiate sessions with source 718 to obtain recommendation data when needed, e.g., when the recommendation data is out of date or when the user equipment device receives a request from the user to receive data. Media recommendations may be provided to the user equipment with any suitable frequency (e.g., continuously, daily, a user-specified period of time, a system-specified period of time, in response to a request from user equipment, etc.). Media recommendation data source 718 may provide user equipment devices 702, 704, and 706 the media recommendation application itself or software updates for the media recommendation application.

In some embodiments, the media recommendation data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media recommendation data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media recommendation data may include a model (e.g., a survivor model) used for generating a score that indicates a likelihood a given user will terminate access to a service/source. For example, the media recommendation application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media recommendation application may generate promotions that entice the user to keep the particular service or source indicated by the score as one to which the user will likely terminate access.

Media recommendation applications may be, for example, stand-alone applications implemented on user equipment devices. For example, the media recommendation application may be implemented as software or a set of executable instructions which may be stored in storage 608, and executed by control circuitry 604 of a user equipment device 600. In some embodiments, media recommendation applications may be client-server applications where only a client application resides on the user equipment device, and server application resides on a remote server. For example, media recommendation applications may be implemented partially as a client application on control circuitry 604 of user equipment device 600 and partially on a remote server as a server application (e.g., media recommendation data source 718) running on control circuitry of the remote server. When executed by control circuitry of the remote server (such as media recommendation data source 718), the media recommendation application may instruct the control circuitry to generate the recommendation application displays and transmit the generated displays to the user equipment devices. The server application may instruct the control circuitry of the media recommendation data source 718 to transmit data for storage on the user equipment. The client application may instruct control circuitry of the receiving user equipment to generate the recommendation application displays.

Content and/or media recommendation data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media recommendation data described above. In addition to content and/or media recommendation data, providers of OTT content can distribute media recommendation applications (e.g., web-based applications or cloud-based applications), or the content can be displayed by media recommendation applications stored on the user equipment device.

Media recommendation system 700 is intended to illustrate a number of approaches, or network configurations, by which user equipment devices and sources of content and recommendation data may communicate with each other for the purpose of accessing content and providing media recommendations. The embodiments described herein may be applied in any one or a subset of these approaches, or in a system employing other approaches for delivering content and providing media recommendations. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media recommendation information or settings to be communicated between the different user equipment devices. For example, it may be desirable for users to maintain consistent media recommendation application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media recommendations. For example, some users may have home networks that are accessed by in-home and mobile devices. Users may control in-home devices via a media recommendation application implemented on a remote device. For example, users may access an online media recommendation application on a website via a personal computer at their office, or a mobile device such as a PDA or web-enabled mobile telephone. The user may set various settings (e.g., recordings, reminders, or other settings) on the online recommendation application to control the user's in-home equipment. The online guide may control the user's equipment directly, or by communicating with a media recommendation application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media recommendation application to communicate directly with content source 716 to access content. Specifically, within a home, users of user television equipment 702 and user computer equipment 704 may access the media recommendation application to navigate among and locate desirable content. Users may also access the media recommendation application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media recommendation data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media recommendation application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to "caused by." For example, a first action being performed directly in response to a second action may not include interstitial steps between the first action and the second action.

Figure 8:
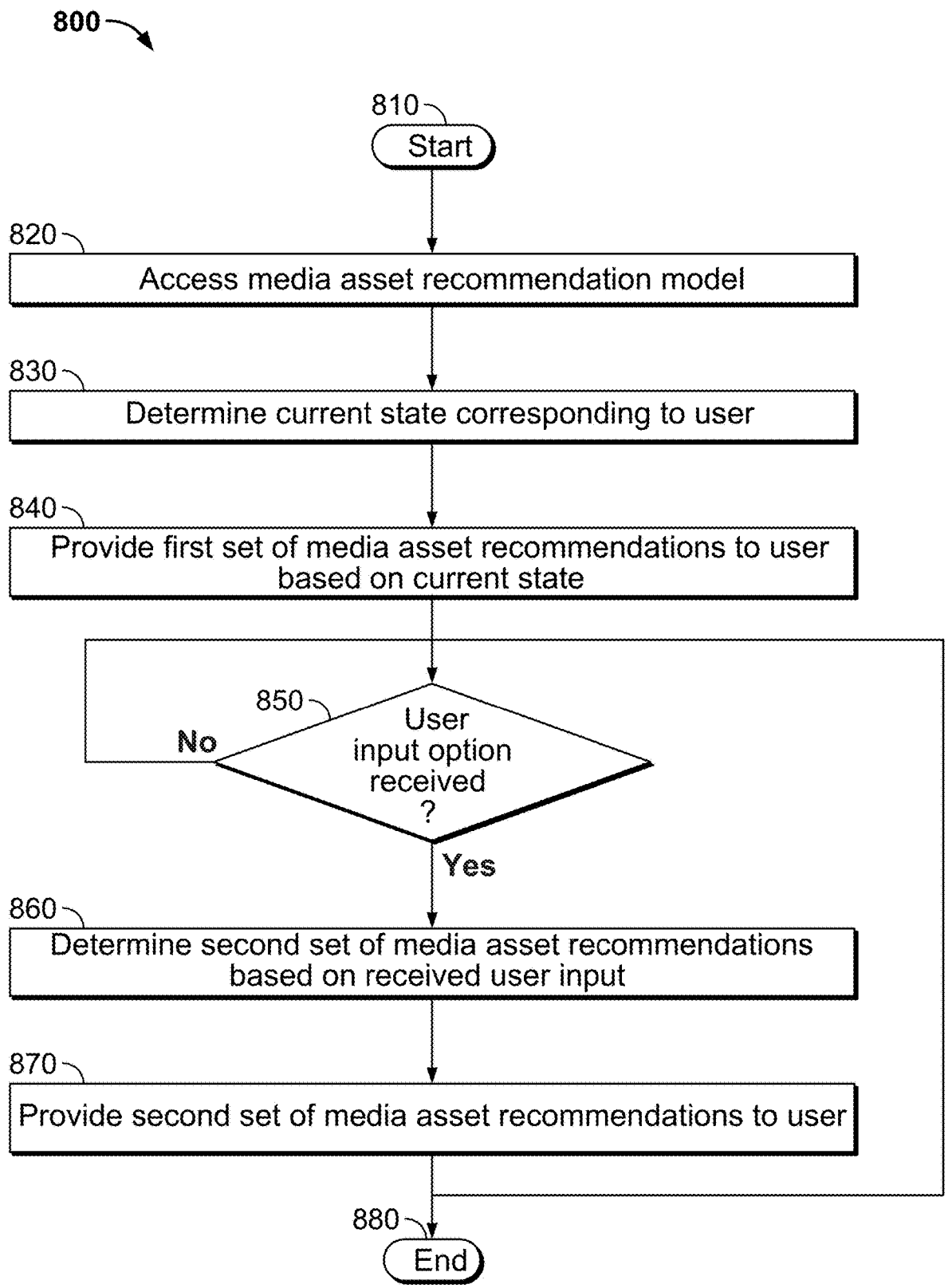
FIG. 8 is a flowchart of illustrative steps involved in recommending media assets to a user, in accordance with some embodiments of the present disclosure.

FIG. 8 is a flowchart of illustrative steps involved in recommending media assets to a user. As shown in FIG. 8, in accordance with some embodiments, a process 800 may be executed by processing circuitry 606 (FIG. 6). It should be noted that process 800 or any step thereof could be performed on, or provided by, the system and/or devices of FIGS. 6 and 7. In addition, one or more steps of process 800 may be incorporated into or combined with one or more other steps described herein. For example, process 800 may be executed by control circuitry 604 of FIG. 6 as instructed by a media recommendation application implemented on a user device in order to provide media asset recommendations to users. Also, one or more steps of process 800 may be incorporated into or combined with one or more steps of any other process or embodiment.

Process 800 begins at step 810. At step 820, process 800 includes the media recommendation application accessing a media asset recommendation model (i.e., the model). The model may correspond to a particular user, and may include a plurality of states that correspond to different genres or categories of media assets. The states each also have a corresponding plurality of possible user input options available to the user, and a state value that corresponds to a reward value and selection probability of the user input options available in each state. Each state also includes a set of media asset recommendations, wherein these recommendations comprise a list or ranking of media assets based on how relevant they are to the user, and/or how likely the user is to view the media asset.

At step 830, the process 800 includes the media recommendation application determining a current state corresponding to the user. This can include control circuitry determining the initial genre to present to the user when the user begins the browsing session, the current genre that is being browsed by the user, or some other determination of the genre or state being presented to the user.

At step 840, the process 800 includes the media recommendation application providing a first set of media asset recommendations to the user based on the current state. This can include input/output circuitry presenting a first subset of media assets on a display, and transmitting a second subset of media assets for storage and later display (e.g., after the user scrolls to the right).

At step 850, the process 800 includes the media recommendation application determining whether a user input option has been received. This may be done using input/output circuitry. The user input options can include a scroll input, genre change input, selection of a media asset, exiting the application, and more. If no input is received, the process may include the media recommendation application maintaining the display of the first set of media asset recommendations, and remaining at step 850 until a user input option is received.

When a user input option is received at step 850, the process 800 includes control circuitry of the media recommendation application determining a second set of media asset recommendations based on the received user input at step 860. The second set of media asset recommendations can include one or more of the same media asset recommendations as the first set. The second set can include a replacement or reordering of one or more media assets. The second set may be determined based on the received user input. For example, if the user input includes scrolling to the right, the second set of media asset recommendations can include one or more media assets from a different genre than the currently browsed genre (i.e., because the likelihood of the user selecting a title from the currently browsed genre has decreased).

At step 870, the process 800 then includes the input/output circuitry of the media recommendation application providing the second set of media asset recommendations to the user. This can include replacing or inserting the second set of media asset recommendations onto the display viewed by the user. This can also include replacing one or more of the currently visible media asset recommendations, and/or replacing one or more of the stored media asset recommendations (e.g., the second subset that is stored for later display).

After the media recommendation application provides the second set of media asset recommendations, the process 800 may continue back to step 850 to await further user input. Alternatively, the process 800 may end in response to a user input exiting the application, a time-out, or a threshold duration of time passing without user input.

It is contemplated that the steps or descriptions of FIG. * may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 6-7 could be used to perform one or more of the steps in FIG. 8.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of providing media asset recommendations to a user based on input to a user interface, the method comprising:
   accessing a media asset recommendation model comprising a plurality of states, each state having:
   a set of media asset recommendations;
   a plurality of user input options available in the state, each user input option having a corresponding input option value comprising (a) a reward value of the input option and (b) a selection probability of the input option; and
   a state value, wherein the state value comprises the input option values corresponding to the state;

determining a current state corresponding to a current browsing session;

providing a first set of media asset recommendations to the user based on the current state corresponding to the current browsing session, wherein the first set of media asset recommendations comprises a first subset available for immediate display and a second subset available for display after additional user input, and wherein providing the first set of media asset recommendations to the user comprises causing the display of the first subset and causing storage of the second subset;

receiving a user input option;

determining a second set of media asset recommendations for the current state based on the received user input option, wherein the second set comprises a modified second subset; and providing the second set of media asset recommendations to the user, wherein providing the second set comprises providing for display the first subset and the modified second subset.

2. The method of claim 1, further comprising determining, based on user profile information associated with the user, for each state, initial values for (a) the set of media asset recommendations, (b) the reward values for each input option available in the state, and (c) the selection probabilities for the input options available in the state.

3. The method of claim 1, wherein the user input option is a first user input option received during the current browsing session, the first user input option comprising one of (a) scrolling to a next media asset recommendation, (b) playing a currently selected media asset, (c) changing from the current state to a next state, and (d) exiting the system; and wherein the method further comprises providing the second set of recommended media assets to the user before a second user input option is received during the current browsing session.

4. The method of claim 1, wherein the user input option is a first user input option received during the current browsing session, the method further comprising:

in response to receiving the first user input option, determining an updated media asset recommendation model;

determining the second set of media asset recommendations for the current state based on the received first user input option and the updated media asset recommendation model; and providing the second set of recommended media assets to the user before a second user input option is received during the current browsing session.

5. The method of claim 1, wherein:

the first set of media asset recommendations comprises a first subset available for immediate display and a second subset available for display after additional user input;

providing the first set of media asset recommendations to the user comprises causing the display of the first subset and causing storage of the second subset;

determining the second set of media asset recommendations for the current state based on the received user input option comprises determining a modified first subset based on the received user input option; and providing the second set of recommended media assets to the user comprises providing for display the modified first subset and the second subset.

6. The method of claim 1, further comprising:

determining a first predicted long-term system reward corresponding to the current state;

determining a second predicted long-term system reward corresponding to a next state; and in response to determining that the second predicted long-term system reward is greater than the first predicted long-term system reward, switching from the current state to the next state.

7. The method of claim 6, further comprising:

in response to switching from the current state to the next state, causing a user interface associated with the user to change one of a text, image, color, highlight, or shading.

8. The method of claim 1, further comprising:

determining whether a next action corresponding to the user is an exploit action or an explore action;

in response to determining that the next action is an exploit action:

switching from the current state to an exploit state having a highest state value;

determining a third set of media asset recommendations for the exploit state based on a predicted long-term system reward associated with the exploit state; and providing the third set of media asset recommendations to the user; and in response to determining that the next action is an explore action:

switching from the current state to an explore state having a low confidence level associated with a state value of the explore state; and determining a fourth set of media asset recommendations based on the explore state; and providing the fourth set of media asset recommendations to the user.

9. The method of claim 1, further comprising:

in response to predicting that the user input option will be an exit action, before receiving the user input option:

switching from the current state to an exploit state having a highest state value;

determining a third set of media asset recommendations for the exploit state; and providing the third set of media asset recommendations to the user.

10. A system for providing media asset recommendations to a user based on user input, the system comprising:

control circuitry configured to:

access a media asset recommendation model comprising a plurality of states, each state having:

a set of media asset recommendations;

a plurality of user input options available in the state, each user input option having a corresponding input option value comprising (a) a reward value of the input option and (b) a selection probability of the input option; and a state value, wherein the state value comprises the input option values corresponding to the state;

determine a current state corresponding to a current browsing session;

determine a second set of media asset recommendations for the current state based on a received user input option; and input/output circuitry configured to:

provide a first set of media asset recommendations to the user based on the current state corresponding to the current browsing session, wherein the first set of media asset recommendations comprises a first subset available for immediate display and a second subset available for display after additional user input, and wherein providing the first set of media asset recommendations to the user comprises causing the display of the first subset and causing storage of the second subset;

receive the user input option; and provide the second set of media asset recommendations to the user, wherein the second set comprises a modified second subset, and wherein providing the second set comprises providing for display the first subset and the modified second subset.

11. The system of claim 10, wherein the control circuitry is further configured to determine based on user profile information associated with the user, for each state, initial values for (a) the set of media asset recommendations, (b) the reward values for each input option available in the state, and (c) the selection probabilities for the input options available in the state.

12. The system of claim 10, wherein the user input option is a first user input option received during the current browsing session, the first user input option comprising one of (a) scrolling to a next media asset recommendation, (b) playing a currently selected media asset, (c) changing from the current state to a next state, and (d) exiting the system, and wherein the input/output circuitry is further configured to provide the second set of recommended media assets to the user before a second user input option is received during the current browsing session.

13. The system of claim 10, wherein:

the user input option is a first user input option received during the current browsing session, and wherein the control circuitry is further configured to:

in response to receiving the first user input option, determine an updated media asset recommendation model; and determine the second set of media asset recommendations for the current state based on the received first user input option and the updated media asset recommendation model; and the input/output circuitry is further configured to provide the second set of recommended media assets to the user before a second user input option is received during the current browsing session.

14. The system of claim 10, wherein:

the first set of media asset recommendations comprises a first subset available for immediate display and a second subset available for display after additional user input, the control circuitry is further configured to determine the second set of media asset recommendations for the current state based on the received user input option by determining a modified first subset based on the received user input option, and the input/output circuitry is further configured to:

provide the first set of media asset recommendations to the user to cause the display of the first subset and to cause storage of the second subset, and provide the second set of recommended media assets to the user by providing for display the modified first subset and the second subset.

15. The system of claim 10, wherein the control circuitry is further configured to:

determine a first predicted long-term system reward corresponding to the current state;

determine a second predicted long-term system reward corresponding to a next state; and in response to determining that the second predicted long-term system reward is greater than the first predicted long-term system reward, switch from the current state to the next state.

16. The system of claim 15, wherein the control circuitry is further configured to:

in response to switching from the current state to the next state, cause a user interface associated with the user to change one of a text, image, color, highlight, or shading.

17. The system of claim 10, wherein the control circuitry is further configured to:

determine whether a next action corresponding to the user is an exploit action or an explore action;

in response to determining that the next action is an exploit action:

switch from the current state to an exploit state having a highest state value; and determine a third set of media asset recommendations for the exploit state based on a predicted long-term system reward associated with the exploit state; and in response to determining that the next action is an explore action:

switch from the current state to an explore state having a low confidence level associated with a state value of the explore state; and determine a fourth set of media asset recommendations based on the explore state; and wherein the input/output circuitry is further configured to provide either the third set of media asset recommendations or the fourth set of media asset recommendations to the user based on the determination whether the next action corresponding to the user is the exploit action or the explore action.

18. The system of claim 10, wherein the control circuitry is further configured to:

in response to predicting that the user input option will be an exit action, before receiving the user input option:

switch from the current state to an exploit state having a highest state value; and determine a third set of media asset recommendations for the exploit state; and wherein the input/output circuitry is further configured to provide the third set of media asset recommendations to the user.

19. A method of providing media asset recommendations to a user based on input to a user interface, the method comprising:

accessing a media asset recommendation model comprising a plurality of states, each state having:

a set of media asset recommendations;

a plurality of user input options available in the state, each user input option having a corresponding input option value comprising (a) a reward value of the input option and (b) a selection probability of the input option; and a state value, wherein the state value comprises the input option values corresponding to the state;

determining a current state corresponding to a current browsing session;

providing a first set of media asset recommendations to the user based on the current state corresponding to the current browsing session, wherein the first set of media asset recommendations comprises a first subset available for immediate display and a second subset available for display after additional user input, and wherein providing the first set of media asset recommendations to the user comprises causing the display of the first subset and causing storage of the second subset;

receiving a user input option;

determining a second set of media asset recommendations for the current state based on the received user input option, wherein the second set comprises a modified first subset; and providing the second set of media asset recommendations to the user, wherein providing the second set comprises providing for display the modified first subset and the second subset.

* * * * *